(12) United States Patent
Kitamoto

(10) Patent No.: US 10,284,069 B2
(45) Date of Patent: May 7, 2019

(54) VOLTAGE CONVERSION DEVICE AND APPARATUS

(71) Applicant: Honda Motor Co., Ltd., Tokyo (JP)

(72) Inventor: Ryota Kitamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/709,481

(22) Filed: Sep. 20, 2017

(65) Prior Publication Data

US 2018/0102701 A1   Apr. 12, 2018

(30) Foreign Application Priority Data

Oct. 12, 2016  (JP) ................................ 2016-201342

(51) Int. Cl.
| | |
|---|---|
| H02M 1/00 | (2006.01) |
| H02M 3/04 | (2006.01) |
| H02J 1/06 | (2006.01) |
| H02J 1/00 | (2006.01) |

(52) U.S. Cl.
CPC ............... H02M 1/00 (2013.01); H02J 1/06 (2013.01); H02M 3/04 (2013.01); *H02J 2001/004* (2013.01); *H02M 2001/0009* (2013.01); *H02M 2001/0025* (2013.01)

(58) Field of Classification Search
CPC ...... H02M 3/156; H02M 3/155; H02M 3/145; H02M 3/158; H02M 3/157
USPC ........................................................ 323/906
See application file for complete search history.

(56) References Cited

U.S. PATENT DOCUMENTS

| | | | | |
|---|---|---|---|---|
| 5,923,100 | A | * 7/1999 | Lukens ..................... | G05F 1/67 136/206 |
| 8,754,627 | B1 | * 6/2014 | Le ............................. | G05F 1/67 323/299 |
| 2014/0198537 | A1 | * 7/2014 | Kimura ............. | H02M 3/33507 363/17 |

FOREIGN PATENT DOCUMENTS

| | | |
|---|---|---|
| JP | 2001112261 | 4/2001 |
| JP | 2009-148107 | 7/2009 |

OTHER PUBLICATIONS

"Office Action of Japan Counterpart Application," dated Jul. 31, 2018, with English translation thereof, p. 1-p. 6.

* cited by examiner

*Primary Examiner* — Nguyen Tran

(74) *Attorney, Agent, or Firm* — JCIPRNET

(57) ABSTRACT

A voltage conversion device can selectively switch between and perform voltage control and current control of a voltage conversion unit in a suitable manner in which output characteristics of a power source are reflected. A control unit (10) of the voltage conversion device (1) selectively switches the control mode of the voltage conversion unit (3) to a current control mode or a voltage control mode on the basis of current-voltage characteristics of the power source (2) and performs a control process of each control mode. The power source (2) has current-voltage characteristics such that the output voltage changes according to the output current and such that a rate of change of the output voltage with respect to a change of the output current changes according to the output current.

14 Claims, 3 Drawing Sheets

VOLTAGE CONVERSION DEVICE AND APPARATUS

CROSS-REFERENCE TO RELATED APPLICATION

This application claims the priority benefit of Japan application serial no. 2016-201342, filed on Oct. 12, 2016. The entirety of the above-mentioned patent application is hereby incorporated by reference herein and made a part of this specification.

BACKGROUND OF THE INVENTION

Field of the Invention

The present invention relates to a voltage conversion device having a function to control a voltage conversion unit capable of converting and outputting a voltage of power input from a power source.

Description of Related Art

A voltage conversion unit such as a switching-type DC/DC converter or the like can control its output voltage or current or its input voltage or current to a desired target value.

A known device including this type of voltage conversion unit allows a voltage conversion unit to be operated selectively in a voltage control mode in which an output voltage or an input voltage of the voltage conversion unit is controlled to a target value or in a current control mode in which an output current or an input current of the voltage conversion unit is controlled to a target value.

For example, Patent Document 1 describes a technique of performing constant voltage control for maintaining the output voltage of a voltage conversion unit at a constant value until the output current of the voltage conversion unit reaches a predetermined value and performing constant current control for maintaining the output current of the voltage conversion unit at a constant value when the output current has become excessive above the predetermined value.

PRIOR ART DOCUMENT

Patent Documents

[Patent Document 1] Japanese Unexamined Patent Application Publication No. 2009-148107

SUMMARY OF THE INVENTION

A power source having various power characteristics may be used as a power source for inputting power to the voltage conversion unit. According to various investigations by the present inventor, it is found that, in the case where the control mode of the voltage conversion unit is selectively switched (to a voltage control mode or a current control mode) to operate the voltage conversion unit, it is desirable in terms of increasing the stability of the operation of the voltage conversion unit or increasing the controllability of the voltage or current in each control mode, depending on the output characteristics of the power source, that the control mode be selected and switched in a manner considering the output characteristics of the power source.

However, the conventional technique, which can be seen in Patent Document 1, does not take into consideration the relationship between the output characteristics of the power source and the switching of the control mode of the voltage conversion unit.

The present invention has been made in view of the above circumstances and it is an object of the present invention to provide a voltage conversion device which can selectively switch between and perform voltage control and current control of a voltage conversion unit in a suitable manner which reflects output characteristics of a power source.

Another object of the present invention is to provide an apparatus including such a voltage conversion device.

In order to achieve the above objects, a first aspect of the present invention provides a voltage conversion device including a voltage conversion unit corrected to a power source having current-voltage characteristics such that an output voltage of the power source changes according to an output current thereof and such that a rate of change of the output voltage with respect to a change of the output current changes according to the output current, the voltage conversion unit being configured to be able to output power obtained by converting a voltage of power input from the power source, and a control unit configured to be able to selectively perform a control process of a current control mode in which the voltage conversion unit is operated to control an input current or an output current of the voltage conversion unit, and a control process of a voltage control mode in which the voltage conversion unit is operated to control an input voltage or an output voltage of the voltage conversion unit, wherein the control unit is configured to selectively switch between the current control mode and the voltage control mode in a preset manner on the basis of the current-voltage characteristics and to perform a control process of each of the control modes (which corresponds to a first form of the present invention).

In the first form of the present invention, the power source is a power source having current-voltage characteristics such that an output voltage of the power source changes according to an output current thereof and such that a rate of change of the output voltage with respect to a change of the output current changes according to the output current. In this case, according to various investigations by the present inventor, by selectively switching between and performing the current control mode and the voltage control mode in a preset manner on the basis of the current-voltage characteristics and performing a control process of each of the control modes, it is possible to selectively switch between and perform voltage control and current control of the voltage conversion unit in a suitable manner in which the output characteristics of the power source are reflected.

In the first form of the present invention, the control unit is preferably configured to perform a control process of the voltage control mode in a region, within an operating region of the power source defined by the current-voltage characteristics, in which a voltage change rate which is a rate of change of the output voltage of the power source with respect to a change of the output current thereof is greater than a current change rate which is a rate of change of the output current of the power source with respect to a change of the output voltage thereof (which corresponds to a second form of the present invention).

Here, the operating state of the power source in the region in which the voltage change rate is greater than the current change rate is a state in which the output voltage of the power source easily varies. By performing a control process of the voltage control mode in this state, it is possible to increase the stability of the input voltage or the output voltage of the voltage conversion unit while allowing only a small change in the output current of the power source. Thus, it is possible to increase the stability of the operating state of the voltage conversion unit.

In the first or second form of the present invention described above, the control unit is preferably configured to perform a control process of the current control mode in a region, within an operating region of the power source defined by the current-voltage characteristics, in which a current change rate which is a rate of change of the output current of the power source with respect to a change of the output voltage thereof is greater than a voltage change rate which is a rate of change of the output voltage of the power source with respect to a change of the output current thereof (which corresponds to a third form of the present invention).

Here, the operating state of the power source in the region in which the current change rate is greater than the voltage change rate is a state in which the output current of the power source easily varies. By performing a control process of the current control mode in this state, it is possible to increase the stability of the input current or the output current of the voltage conversion unit while allowing only a small change in the output voltage of the power source. Thus, it is possible to increase the stability of the operating state of the voltage conversion unit.

When the third form of the present invention is combined with the second form, it is possible to switch the control mode from one of the voltage control mode and the current control mode to the other in a state in which the voltage change rate and the current change rate are the same or the same, and therefore it is possible to increase the stability of the operation of the voltage conversion unit before and after the switching.

In the second or third form of the present invention, the control unit may be configured to determine a control mode to be performed from among the voltage control mode and the current control mode on the basis of a magnitude relation between a measured value of the output current or the output voltage of the power source and a predetermined threshold value and to perform a control process of the determined control mode (which corresponds to a fourth form of the present invention).

That is, whether the power source is operating in a region in which the voltage change rate is greater than the current change rate (hereinafter also referred to as a great voltage change rate region) or in a region in which the current change rate is greater than the voltage change rate (hereinafter also referred to as a great current change rate region) depends on a range to which the measured value of the output current or the output voltage of the power source belongs.

Accordingly, according to the fourth form of the present invention, it is possible to perform a control process of a control mode suitable for the operating state of the power source on the basis of a magnitude relation between the measured value of the output current or the output voltage of the power source and the predetermined threshold value without the need to perform a process of determining the value of the voltage change rate and the current change rate.

In the fourth form of the present invention, the predetermined threshold value may be set to a value matching an output voltage value or an output current value of the power source at an operating point at which the current change rate and the voltage change rate are the same within the operating region of the power source defined by the current-voltage characteristics (which corresponds to a fifth form of the present invention).

According to this, whether the operating state of the power source is in the great voltage change rate region or in the great current change rate region is defined by whether the output voltage or the output current of the power source is greater than or smaller than the threshold value.

Accordingly, it is possible to perform a control process of the voltage control mode in the great voltage change rate region and a control process of the current control mode in the great current change rate region with high reliability.

In addition, since the control mode is switched at an operating point at which the voltage change rate and the current change rate are the same, it is possible to minimize changes in the operation of the voltage conversion unit upon the switching.

In the forth form of the present invention described above, it is possible to adopt a form in which the predetermined threshold value includes a higher threshold value and a lower threshold value which are set above and below a value matching an output voltage value or an output current value of the power source at an operating point at which the current change rate and the voltage change rate are the same within the operating region of the power source defined by the current-voltage characteristics, and the control unit is configured to perform control processes of different control modes in the voltage control mode and the current control mode when a measured value of the output current or the output voltage of the power source is greater than the higher threshold value and when the measured value thereof is smaller than the lower threshold value and to perform, when the measured value has changed from a value greater than the higher threshold value or from a value smaller than the lower threshold value to a value within a range between the higher threshold value and the lower threshold value, a control process of the same control mode as a control mode immediately before the change (which corresponds to a sixth form of the present invention).

According to this, switching of the control mode according to the change of the measured value of the output current or the output voltage of the power source is performed in a manner having hysteresis characteristics in the vicinity of the operating point at which the current change rate and the voltage change rate are the same. Therefore, it is possible to prevent frequent switching of the control mode.

When the measured value of the output current or the output voltage of the power source is within the range between the higher threshold value and the lower threshold value, a control process of the current control mode may be performed in the great voltage change rate region or a control process of the voltage control mode may be performed in the great current change rate region. However, the range between the higher threshold value and the lower threshold value can be set to a region in the vicinity of the operating point. Thus, the range between the higher threshold value and the lower threshold value can be set to a region in which the voltage change rate and the current change rate do not significantly differ. Therefore, it is possible to sufficiently secure the stability of current control and the stability of voltage control also in the range.

In the fifth or sixth form of the present invention described above, it is possible to adopt a form in which the control process of the voltage control mode is a process of determining an operational amount through a feedback control process and controlling the voltage conversion unit according to the operational amount, such that the input voltage or the output voltage of the voltage conversion unit approaches a target voltage, and the control process of the current control mode is a process of determining an operational amount through a feedback control process and controlling the voltage conversion unit according to the operational amount, such that the input current or the output current of the voltage conversion unit approaches a target current.

In this case, the control unit is preferably configured to change a voltage control gain which is a gain of a feedback control process in the voltage control mode and a current control gain which is a gain of a feedback control process in the current control mode according to a measured value of the output current or the output voltage of the power source and to allow a value of the voltage control gain and a value of the current control gain to match each other in a state in which a measured value of the output current or the output voltage of the power source matches a value at the operating point (which corresponds to a seventh form of the present invention).

In the seventh form of the present invention, "the gain of the feedback control process in the voltage control mode" refers to the sensitivity of a change in the operational amount (control input) with respect to a change of the deviation between the measured value of the input voltage or the output voltage of the voltage conversion unit in the voltage control mode and a target voltage. In addition, "the gain of the feedback control process in the current control mode" refers to the sensitivity of a change in the operational amount (control input) with respect to a change of the deviation between the measured value of the input current or the output current of the voltage conversion unit in the current control mode and a target current. The same is true for an eighth form of the present invention which is described below.

According to the seventh form of the present invention, it is possible to perform switching of the control mode in a state in which a value of the voltage control gain and a value of the current control gain match each other (when the fifth form is combined with the seventh form). Alternatively, it is possible to perform switching of the control mode in a state in which a value of the voltage control gain and a value of the current control gain are close to each other (when the sixth form is combined with the seventh form).

Therefore, the operational amount (control input) generated by the control process in one of the voltage control mode and the current control mode and the operational amount (control input) generated by the control process in the other control mode can be prevented from greatly changing before and after switching of the control mode. Thus, it is possible to increase the stability of the operation of the voltage conversion unit.

In the case where the sixth form of the present invention adopts the configuration of the seventh form, it is preferable that among the voltage control mode and the current control mode, when a measured value of the output current or the output voltage of the power source is greater than the higher threshold value, a mode of a control process to be performed is defined as a higher control mode, and when the measured value is smaller than the lower threshold value, a mode of a control process to be performed is defined as a lower control mode, and among the voltage control gain and the current control gain, when a gain corresponding to the higher control mode is defined as a higher control gain and a gain corresponding to the lower control mode is defined as a lower control gain, the higher threshold value and the lower threshold value be set such that a value of the lower control gain when a value of the output current or the output voltage of the power source matches the higher threshold value matches a value of the higher control gain when a value of the output current or the output voltage of the power source matches the lower threshold value (which corresponds to an eighth form of the present invention).

According to this, it is possible to increase the stability of control of the voltage conversion unit.

In addition, a second aspect of the present invention provides a voltage conversion device including a voltage conversion unit connected to a power source having current-voltage characteristics such that an output voltage of the power source changes according to an output current thereof and such that a rate of change of the output voltage with respect to a change of the output current changes according to the output current, the voltage conversion unit being configured to be able to output power obtained by converting a voltage of power input from the power source, and a control unit configured to be able to selectively perform a control process of a current control mode in which the voltage conversion unit is operated to control an input current or an output current of the voltage conversion unit, and a control process of a voltage control mode in which the voltage conversion unit is operated to control an input voltage or an output voltage of the voltage conversion unit, wherein the control unit is configured to perform a control process of the voltage control mode in a region, within an operating region of the power source defined by the current-voltage characteristics, in which a voltage change rate which is a rate of change of the output voltage of the power source with respect to a change of the output current thereof is greater than a current change rate which is a rate of change of the output current of the power source with respect to a change of the output voltage thereof and to perform a control process of the current control mode in a region, within the operating region, in which the current change rate is greater than the voltage change rate (which corresponds to a ninth form of the present invention).

According to this, it is possible to achieve the same effects as the second and third forms of the present invention.

Further, a third aspect of the present invention provides a voltage conversion device including a voltage conversion unit connected to a power source having current-voltage characteristics such that an output voltage of the power source decreases as an output current thereof increases and such that a rate of change of the output voltage with respect to a change of the output current decreases as the output current increases, the voltage conversion unit being configured to be able to output power obtained by converting a voltage of power input from the power source, and a control unit configured to be able to selectively perform a control process of a current control mode in which the voltage conversion unit is operated to control an input current or an output current of the voltage conversion unit, and a control process of a voltage control mode in which the voltage conversion unit is operated to control an input voltage or an output voltage of the voltage conversion unit, wherein the control unit is configured to use a threshold value which is set to a value matching an output current value of the power source at an operating point at which a voltage change rate which is a rate of change of the output voltage of the power source with respect to a change of the output current thereof and a current change rate which is a rate of change of the output current of the power source with respect to a change of the output voltage thereof are the same within an operating region of the power source defined by the current-voltage characteristics, and the control unit is configured to perform a control process of the voltage control mode when a measured value of the output current of the power source is smaller than the threshold value and to perform a control process of the current control mode when the measured value is greater than the threshold value (which corresponds to a tenth form of the present invention).

Furthermore, a fourth aspect of the present invention provides a voltage conversion device including a voltage conversion unit connected to a power source having current-voltage characteristics such that an output voltage of the power source decreases as an output current thereof increases and such that a rate of change of the output voltage with respect to a change of the output current decreases as the output current increases, the voltage conversion unit being configured to be able to output power obtained by converting a voltage of power input from the power source, and a control unit configured to be able to selectively perform a control process of a current control mode in which the voltage conversion unit is operated to control an input current or an output current of the voltage conversion unit, and a control process of a voltage control mode in which the voltage conversion unit is operated to control an input voltage or an output voltage of the voltage conversion unit, wherein the control unit is configured to use a threshold value which is set to a value matching an output voltage value of the power source at an operating point at which a voltage change rate which is a rate of change of the output voltage of the power source with respect to a change of the output current thereof and a current change rate which is a rate of change of the output current of the power source with respect to a change of the output voltage thereof are the same within an operating region of the power source defined by the current-voltage characteristics, and the control unit is configured to perform a control process of the voltage control mode when a measured value of the output voltage of the power source is greater than the threshold value and to perform a control process of the current control mode when the measured value is smaller than the threshold value (which corresponds to an eleventh form of the present invention).

According to the tenth and eleventh forms of the present invention, for a voltage conversion device which uses a power source having current-voltage characteristics such that an output voltage of the power source decreases as an output current thereof increases and such that a rate of change of the output voltage with respect to a change of the output current decreases as the output current increases, it is possible to achieve the same effects as the second to fifth forms of the present invention.

Furthermore, a fifth aspect of the present invention provides a voltage conversion device including a voltage conversion unit connected to a power source having current-voltage characteristics such that an output voltage of the power source decreases as an output current thereof increases and such that a rate of change of the output voltage with respect to a change of the output current decreases as the output current increases, the voltage conversion unit being configured to be able to output power obtained by converting a voltage of power input from the power source, and a control unit configured to be able to selectively perform a control process of a current control mode in which the voltage conversion unit is operated to control an input current or an output current of the voltage conversion unit, and a control process of a voltage control mode in which the voltage conversion unit is operated to control an input voltage or an output voltage of the voltage conversion unit, wherein the control unit is configured to use a higher threshold value and a lower threshold value which are set above and below a value matching an output current value of the power source at an operating point at which a voltage change rate which is a rate of change of the output voltage of the power source with respect to a change of the output current thereof and a current change rate which is a rate of change of the output current of the power source with respect to a change of the output voltage thereof are the same within an operating region of the power source defined by the current-voltage characteristics, and the control unit is configured to perform a control process of the voltage control mode when a measured value of the output current of the power source is smaller than the lower threshold value and to perform a control process of the current control mode when the measured value is greater than the higher threshold value, and to perform, when the measured value has changed from a value greater than the higher threshold value or from a value smaller than the lower threshold value to a value within a range between the higher threshold value and the lower threshold value, a control process of the same control mode as a control mode immediately before the change (which corresponds to a twelfth form of the present invention).

Furthermore, a sixth aspect of the present invention provides a voltage conversion device including a voltage conversion unit connected to a power source having current-voltage characteristics such that an output voltage of the power source decreases as an output current thereof increases and such that a rate of change of the output voltage with respect to a change of the output current decreases as the output current increases, the voltage conversion unit being configured to be able to output power obtained by converting a voltage of power input from the power source, and a control unit configured to be able to selectively perform a control process of a current control mode in which the voltage conversion unit is operated to control an input current or an output current of the voltage conversion unit, and a control process of a voltage control mode in which the voltage conversion unit is operated to control an input voltage or an output voltage of the voltage conversion unit, wherein the control unit is configured to use a higher threshold value and a lower threshold value which are set above and below a value matching an output voltage value of the power source at an operating point at which a voltage change rate which is a rate of change of the output voltage of the power source with respect to a change of the output current thereof and a current change rate which is a rate of change of the output current of the power source with respect to a change of the output voltage thereof are the same within an operating region of the power source defined by the current-voltage characteristics and the control unit is configured to perform a control process of the current control mode when a measured value of the output voltage of the power source is smaller than the lower threshold value and to perform a control process of the voltage control mode when the measured value is greater than the higher threshold value, and to perform, when the measured value has changed from a value greater than the higher threshold value or from a value smaller than the lower threshold value to a value within a range between the higher threshold value and the lower threshold value, a control process of the same control mode as a control mode immediately before the change (which corresponds to a thirteenth form of the present invention).

According to the twelfth and thirteenth forms of the present invention, for a voltage conversion device which uses a power source having current-voltage characteristics such that an output voltage of the power source decreases as an output current thereof increases and such that a rate of change of the output voltage with respect to a change of the output current decreases as the output current increases, it is possible to achieve the same effects as the second, third, and sixth forms of the present invention.

In addition, in the tenth to thirteenth forms of the present invention, it is possible to further adopt the same configuration as the seventh form of the present invention. Further, in the twelfth and thirteenth forms of the present invention, it is possible to further adopt the same configuration as the eighth form of the present invention.

Furthermore, in the first to thirteenth forms of the present invention, it is possible to use, for example, a fuel cell as the power source (which corresponds to a fourteenth form of the present invention).

According to this, it is possible to provide a voltage conversion device which can be suitably applied to a fuel cell. In this case, the current-voltage characteristics of the fuel cell are the same as the current-voltage characteristics of the power source of the tenth to fourteenth forms of the present invention.

Furthermore, the present invention provides an apparatus including the voltage conversion device according to any one of the first to fourteenth forms of the present invention.

According to this, it is possible to provide an apparatus that achieves the effects described with regard to the first to fourteenth forms of the present invention. A transportation device such as a vehicle may be adopted as an example of the apparatus.

DESCRIPTION OF THE EMBODIMENTS

Figure 1:
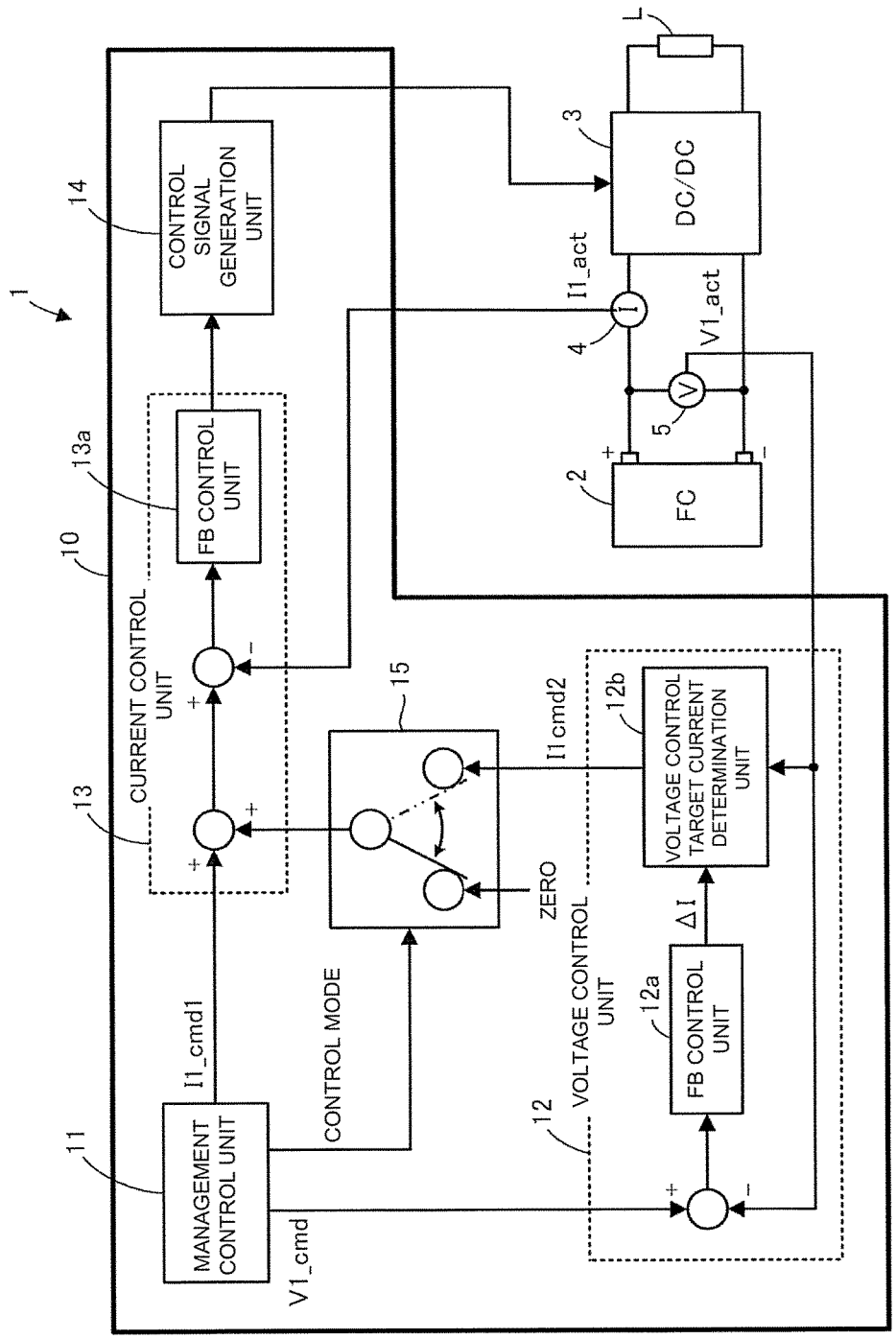
FIG. 1 is a diagram showing an overall configuration of a voltage conversion device according to an embodiment of the present invention.

Hereinafter, an embodiment of the present invention will be described below with reference to FIGS. 1 to 3. As shown in FIG. 1, the voltage conversion device 1 according to the present embodiment includes a voltage conversion unit 3 that outputs power (DC power) obtained by converting a voltage of power (DC power) input from a power source 2, and a control unit 10 that controls the voltage conversion unit 3.

The voltage conversion device 1 is mounted to an apparatus (not shown) having an actuator or the like that operates using power of the power source 2. For example, the voltage conversion device 1 may be mounted to a vehicle (an electric vehicle or a hybrid vehicle) or the like provided with a travel motor that operates using power of the power source 2.

In the present embodiment, the power source 2 is, for example, a fuel cell. The power source 2 (hereinafter referred to as a fuel cell 2) has current-voltage characteristics of a pattern illustrated in the graphs of FIGS. 2A and 2B.

Figure 2A:
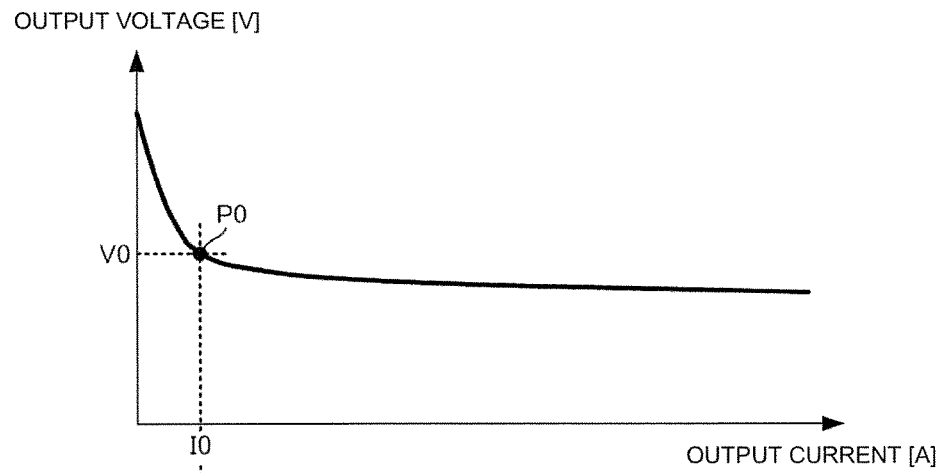
FIG. 2A is a graph showing characteristics of an output voltage changing with respect to an output current of a power source (fuel cell) in the embodiment.

FIG. 2A is a graph showing the characteristics of how the output voltage of the fuel cell 2 changes with respect to the change of the output current thereof. As shown in FIG. 2A, the output voltage of the fuel cell 2 monotonically decreases as the output current increases.

Figure 2B:
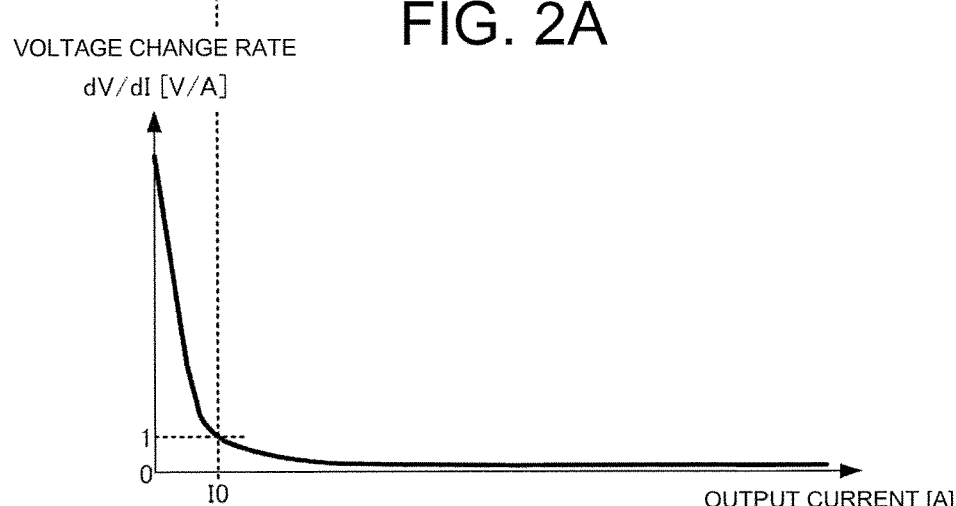
FIG. 2B is a graph showing characteristics of a voltage change rate changing with respect to the output current of the power source (fuel cell) in the embodiment.

FIG. 2B is a graph showing the characteristics of how the voltage change rate, which is the change rate of the output voltage with respect to the change of the output current of the fuel cell 2, changes with respect to the change of the output current. More specifically, the voltage change rate is the absolute value of the amount of change of the output voltage per unit amount of change (unit of increase) of the output current of the fuel cell 2 (in other words, the absolute value of a value dV/dI obtained by differentiating the output voltage V with respect to the output current I). As shown in FIG. 2B, the voltage change rate of the fuel cell 2 monotonically decreases as the output current increases.

In this specification, when it is stated that an arbitrary state quantity A decreases monotonically with an increase in a state quantity B, it means a monotonic decrease of the state quantity A in a form which may partially include a section in which the state quantity A is maintained constant (i.e., it means a monotonic decrease in a broad sense).

As can be seen from the graphs of FIGS. 2A and 2B, the voltage change rate at an operating point P0 at which a set of the output current and the output voltage of the fuel cell 2 has a value (I0, V0) is "1". In other words, at the operating point P0, the voltage change rate of the fuel cell 2 is equal to its inverse.

Here, the inverse of the voltage change rate is the change rate of the output current with respect to the change of the output voltage of the fuel cell 2 (specifically, the absolute value of the amount of change of the output current per unit amount of change of the output voltage, which will hereinafter be referred to as a current change rate). Therefore, at the operating point P0, the voltage change rate and the current change rate of the fuel cell 2 have the same value. Hereinafter, the operating point P0 of the fuel cell 2 is referred to as a reference operating point P0.

The current-voltage characteristics of the fuel cell 2 are not limited to those of the present embodiment and may be characteristics that are found in general fuel cells.

The voltage conversion unit 3 is a DC/DC converter having a known configuration of switching type, and an input side (primary side) thereof is connected to a positive electrode terminal and a negative electrode terminal of the fuel cell 2 and an output side (secondary side) thereof is connected to an electrical load L such as an electric actuator.

The electrical load L is not limited to one that can be operated by DC power. For example, by interposing an inverter between the voltage conversion unit 3 and the electrical load L, it is possible to use an electrical load (for example, an electric motor such as an induction motor or a synchronous motor) that can be operated by AC power as the electrical load L.

The voltage conversion unit 3 is capable of outputting DC power obtained by converting (stepping up or stepping down) the DC power voltage input from the fuel cell 2 to the electrical load L. More specifically, the voltage conversion unit 3 controls the on/off duty of a switch element (not shown) included in the voltage conversion unit 3 in a state in which DC power has been input from the fuel cell 2, such that the voltage conversion unit 3 steps up (or steps down) the voltage of the input DC power at a step-up ratio (or a step-down ratio) corresponding to the duty and outputs the stepped-up (or stepped-down) DC power to the electrical load L.

A current detector 4 for detecting an actual input current $I1\_act$ of the voltage conversion unit 3 (in other words, the output current of the fuel cell 2) and a voltage detector 5 for detecting an actual input voltage $V1\_act$ of the voltage conversion unit 3 (in other words, the output voltage of the fuel cell 2) are provided on the input side (primary side) of the voltage conversion unit 3 in order to control operation of the voltage conversion unit 3.

In the present embodiment, the input current $I1\_act$ and the input voltage $V1\_act$ of the voltage conversion unit 3 correspond to the output current and the output voltage of the fuel cell 2, respectively. Therefore, in the description of the present embodiment, the input current of the voltage conversion unit 3 and the output current of the fuel cell 2 are denoted by the same reference numeral $I1\_act$ and the input voltage of the voltage conversion unit 3 and the output voltage of the fuel cell 2 are denoted by the same reference numeral $V1\_act$.

Supplementally, a power source (for example, a secondary battery) other than the fuel cell 2 may further be connected to the input side of the voltage conversion unit 3. In this case, a detector for detecting the output current or the output voltage of the fuel cell 2 may be provided separately from the detector for detecting the input current $I1\_act$ or the input voltage $V1\_act$ of the voltage conversion unit 3.

The control unit 10 is constituted by one or a plurality of electronic circuit units including a CPU, a RAM, a ROM, an interface circuit, and the like. Detection data of each of the current detector 4 and the voltage detector 5 is input to the control unit 10. Detection data indicating an operating state of the electrical load L, data indicating an operation target of the electrical load L or the like is also input to the control unit 10.

Then, the control unit 10 controls the voltage conversion unit 3 according to an embedded hardware configuration or a function realized by a program (or a software configuration).

In the present embodiment, the control unit 10 controls the voltage conversion unit 3 selectively in two control modes which are a voltage control mode for controlling the input voltage $V1\_act$ of the voltage conversion unit 3 and a current control mode for controlling the input current $I1\_act$ of the voltage conversion unit 3.

More specifically, the voltage control mode is a mode for controlling the voltage conversion unit 3 such that the actual input voltage $V1\_act$ of the voltage conversion unit 3 approaches (and eventually converges on) a desired target voltage. Further, the current control mode is a mode for controlling the voltage conversion unit 3 such that the actual input current $I1\_act$ of the voltage conversion unit 3 approaches (and eventually converges on) a desired target current.

In order to perform control processes of these control modes, the control unit 10 includes, as its functions, a management control unit 11 that determines (selects) the control mode and determines a control target value (a target voltage $V1\_cmd$ or a target current $I1\_cmd1$) in each control mode, a voltage control unit 12 that performs a control process of a voltage control mode, a current control unit 13 that performs a control process of a current control mode, a control signal generation unit 14 that generates a control signal defining the operation of the voltage conversion unit 3, and a switching unit 15 that performs a process for switching the target current to be supplied to the current control unit 13 according to the control mode.

Here, in the present embodiment, in the voltage control mode, the control unit 10 uses the same control process as a feedback control process performed by the current control unit 13 in the current control mode to determine a control input (an operational amount) to be given to the control signal generation unit 14. Therefore, in the voltage control mode, the voltage control unit 12 sequentially generates a target current $I1\_cmd2$ for voltage control.

The switching unit 15 outputs the target current $I1\_cmd2$ for voltage control generated by the voltage control unit 12 to the current control unit 13 in the voltage control mode and outputs zero to the current control unit 13 in the current control mode.

In the present embodiment, the control signal generated by the control signal generation unit 14 is a duty signal that defines the on/off duty of the switch element of the voltage conversion unit 3.

Details of the processing of the control unit 10 are described below.

The control unit 10 determines the control mode through processing of the management control unit 11. The management control unit 11 determines the control mode according to one of the output current $I1\_act$ and the output voltage $V1\_act$ of the fuel cell 2, for example, according to a measured value of the output current $I1\_act$.

Here, two regions in an operating region of the fuel cell 2 defined by the current-voltage characteristics shown in FIG. 2A will be considered, the first being a region in which the output current $I1\_act$ is smaller than the current value $I0$ at the reference operating point P0 (corresponding to a region in which the output voltage $V1\_act$ is greater than the voltage value $V0$ at the reference operating point P0), and the second a region in which the output current $I1\_act$ is greater than the current value $I0$ at the reference operating point P0 (corresponding to a region in which the output voltage $V1\_act$ is smaller than the voltage value $V0$ at the reference operating point P0). The region in which $I1\_act<I0$ (i.e., the region in which $V1\_act>V0$) is, in other words, a region in which a voltage change rate defined by the current-voltage characteristics of the fuel cell 2 is greater than a current change rate. Accordingly, in this region, the output voltage $V1\_act$ changes sensitively with respect to the change of the output current $I1\_act$. Therefore, this region is suitable for the control process of the voltage control mode.

On the other hand, the region in which $I1\_act>I0$ (i.e., the region in which $V1\_act<V0$) is, in other words, a region in which the current change rate defined by the current-voltage characteristics of the fuel cell 2 is greater than the voltage change rate. Accordingly, in this region, the output current $I1\_act$ changes sensitively with respect to the change of the output voltage $V1\_act$. Therefore, this region is suitable for the control process of the current control mode.

Therefore, the management control unit 11 basically selects the voltage control mode as the control mode to be performed in the region in which $I1\_act<I0$ (i.e., in the region in which $V1\_act>V0$) and selects the current control mode as the control mode to be performed in the region in which $I1\_act>I0$ (i.e., in the region in which $V1\_act<V0$).

However, if the control mode is determined according to whether or not $I1\_act$ is greater than the current value $I0$ at the reference operating point P0 (or whether or not $V1\_act$ is greater than the voltage value $V0$ at the reference operating point P0), there is concern of the control mode being switched too frequently when the fuel cell 2 supplies power in the vicinity of the reference operating point P0.

Therefore, in the present embodiment, the management control unit 11 uses a lower threshold value $IthL$ preset to a value slightly smaller than the current value $I0$ at the reference operating point P0 and a higher threshold value IthH preset to a value slightly greater than the current value I0 and performs determination and switching of the control mode to have hysteresis characteristics according to the magnitude relation between the threshold values IthL and IthH and the output current I1_act of the fuel cell 2.

Specifically, the management control unit 11 selects the voltage control mode as the control mode to be performed when a measured value of the output current I1_act of the fuel cell 2 is equal to or smaller than the lower threshold value IthL, and selects the current control mode as the control mode to be performed when the measured value of the output current I1_act is equal to or greater than the higher threshold value IthH.

Further, when the measured value of I1_act has changed from a value outside a range between the lower threshold value IthL and the higher threshold value IthH to a value within the range, the management control unit 11 selects, as a control mode after the change, the same control mode as that immediately before the change. That is, when the measured value of I1_act has changed from a state in which I1_act≤IthL to a state in which IthL<I1_act<IthH, the voltage control mode is selected as a control mode after the change, and, when the measured value of I1_act has changed from a state in which I1_act≥IthH to a state in which IthL<I1_act<IthH, the current control mode is selected as a control mode after the change.

In this manner, it is possible to prevent frequent switching of the control mode.

Figure 2C:
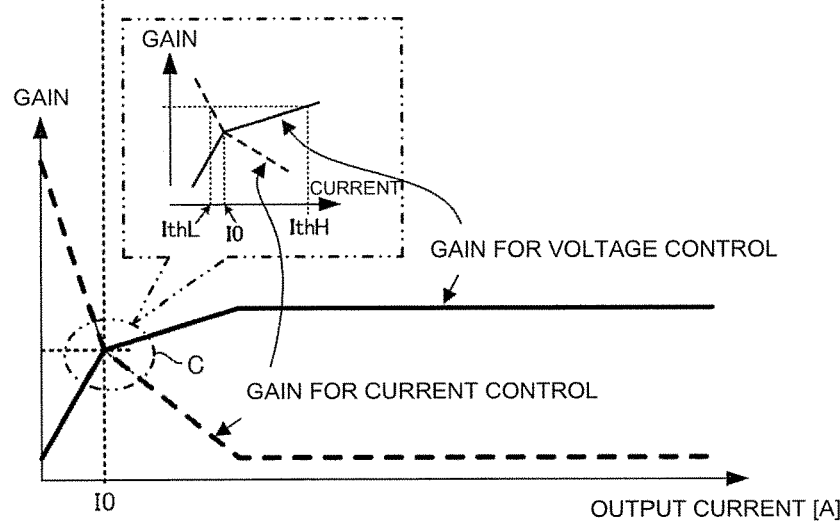
FIG. 2C is a graph showing characteristics of a gain for voltage control and a gain for current control changing according to the output current of the power source (fuel cell).

The lower threshold value IthL and the higher threshold value IthH may be set, for example, as shown in an enlarged view of a portion C in FIG. 2C. This will be described later.

Supplementally, although the control mode is determined according to the measured value of the output current I1_act of the fuel cell 2 in the above description, the control mode may also be determined according to the measured value of the output voltage V1_act.

For example, the control mode may be determined in the same manner as described above using a lower threshold value VthL slightly smaller than the voltage value V0 at the reference operating point P0 and a higher threshold value VthH slightly greater than the voltage value V0.

In this case, a value of the output voltage V1_act when the output current I1_act is the higher threshold value IthH and a value of the output voltage V1_act when the output current I1_act is the lower threshold value IthL in the current-voltage characteristics of the fuel cell 2 may be used as the lower threshold value VthL and the higher threshold value VthH for the output voltage V1_act, respectively.

Then, the voltage control mode is selected when the measured value of the output voltage V1_act of the fuel cell 2 is V1_act≥ VthH and the current control mode is selected when V1_act≤VthL. Further, when the measured value of V1_act has changed from a value outside a range in which VthL<V1_act<VthH to a value within the range, a control mode after the change is kept the same as a control mode immediately before the change.

In addition, for example, correlation data (map data or a function formula) indicating the relationship between the voltage change rate or the current change rate defined by the current-voltage characteristics of the fuel cell 2 and the output current or output voltage of the fuel cell 2 may be previously created and stored in a memory of the control unit 10. The control mode may then be selected by comparing a voltage change rate or a current change rate obtained from the measured value of the output current or the output voltage using the correlation data with a higher threshold value and a lower threshold value which are set above and below the voltage change rate or the current change rate value (=1) at the reference operating point P0.

The management control unit 11 sequentially determines a control target value in each of the control modes selected as described above. In this case, the management control unit 11 determines a target current I1_cmd1 for the input current of the voltage conversion unit 3 in the current control mode and determines a target voltage V1_cmd for the input voltage of the voltage conversion unit 3 in the voltage control mode.

The target current I1_cmd1 or the target voltage V1_cmd may be determined, for example, according to an actual operating state of the electrical load L, a target operating state, or the like.

In a state in which the management control unit 11 has selected the current control mode, the control unit 10 performs the processing of the current control unit 13 and further performs the processing of the control signal generation unit 14 to generate a control signal (a duty signal) of the voltage conversion unit 3. Then, the control unit 10 controls the on/off duty of the switch element of the voltage conversion unit 3 according to the control signal generated by the control signal generation unit 14.

In this case, the processing of the current control unit 13 is performed as follows. In the current control mode, a target current I1_cmd1 is input from the management control unit 11 to the current control unit 13 and a measured value of the input current I1_act of the voltage conversion unit 3 is also input from the current detector 4 to the current control unit 13. Further, the input value from the switching unit 15 to the current control unit 13 is zero.

As shown in FIG. 1, the current control unit 13 sequentially determines a control input (an operational amount) to be given to the control signal generation unit 14 through the feedback control unit 13a in accordance with the deviation (=I1_cmd1−I1_act, hereinafter referred to as a current deviation) between the target current I1_cmd1 and the measured value of the input current I1_act.

In this case, the feedback control unit 13a determines the control input such that the current deviation approaches zero through a predetermined feedback control scheme. As the feedback control scheme, it is possible to use, for example, a proportional scheme, a proportional-derivative scheme (a PD control scheme), a proportional-integral scheme (a PI control scheme), or a proportional-integral-derivative scheme (a PID control scheme).

In the processing of the feedback control unit 13a, the gain (current control gain) of the feedback control is set variably according to the measured value of the output current I1_act of the fuel cell 2 as illustrated in FIG. 2C. More specifically, the current control gain corresponds to the sensitivity of the change in the control input (operational amount) with respect to the change of the current deviation (i.e., the amount of change in the control input per unit amount of change of the current deviation). For example, the current control gain corresponds to a coefficient of a proportional term (which is a term proportional to the current deviation) in an arithmetic process in the feedback control process.

In this case, the current control gain is set by a pre-created map, arithmetic expression or the like such that the current control gain changes according to the output current I1_act, that is, monotonically decreases as the output current I1_act increases with the same tendency as the voltage change rate shown in FIG. 2B.

In the present embodiment, the current control mode corresponds to a higher control mode described in the present invention and current control gain corresponds to a higher control gain described in the present invention.

Supplementally, the current control gain may also be set according to the measured value of the output voltage V1_act of the fuel cell 2. In this case, the current control gain is set such that it increases monotonically as the output voltage V1_act increases.

The on/off duty of the switch element of the voltage conversion unit 3 is controlled by a control signal that the control signal generation unit 14 generates according to the control input determined by the current control unit 13 as described above. This allows the step-up rate (or the step-down rate) of the voltage conversion unit 3 to be adjusted such that the actual input current I1_act of the voltage conversion unit 3 approaches (and eventually converges on) the target current I1_cmd determined by the management control unit 11.

Next, in a state in which the management control unit 11 has selected the voltage control mode, the control unit 10 sequentially determines the target current I1_cmd2 for voltage control by performing the processing of the voltage control unit 12 and inputs this target current I1_cmd2 to the current control unit 13 via the switching unit 15.

In the voltage control mode, the control unit 10 fixes the target current I1_cmd1 determined by the management control unit 11 steadily to zero or to a final value used in the current control mode. That is, in the voltage control mode, the target current I1_cmd2 for voltage control and the target current I1_cmd1 determined by the management control unit 11 do not both change, but the target current I1_cmd2 changes based on the target voltage V1_cmd input from the management control unit 11.

Therefore, in the voltage control mode, the current control unit 13 determines the control input (operational amount) by performing the processing of the feedback control unit 13a according to the current deviation (=I1_cmd1+I1_cmd2−I1_act) calculated using the fixed target current I1_cmd1 determined by the management control unit 11 and the target current I1_cmd2 determined by the voltage control unit 12.

The processing of the voltage control unit 12 in this voltage control mode is performed as follows. In the voltage control mode, the target voltage V1_cmd is input from the management control unit 11 to the voltage control unit 12 and a measured value of the input voltage V1_act of the voltage conversion unit 3 is also input from the voltage detector 5 to the voltage control unit 12.

Then, the voltage control unit 12 sequentially determines a current adjustment amount ΔI (an increment/decrement amount of the input current I1_act) of the input current I1_act of the voltage conversion unit 3 through the feedback control unit 12a according to the deviation (=V1_cmd−V1_act, hereinafter referred to as a voltage deviation) between the target voltage V1_cmd and the measured value of the input voltage V1_act.

In this case, the feedback control unit 12a determines a current adjustment amount ΔI as a control input (an operational amount) such that the voltage deviation approaches zero through a predetermined feedback control scheme. As the feedback control scheme, it is possible to use, for example, a proportional scheme, a proportional-derivative scheme (a PD control scheme), a proportional-integral scheme (a PI control scheme), or a proportional-integral-derivative scheme (a PID control scheme).

In the processing of the feedback control unit 12a, the gain of the feedback control (voltage control gain) is set variably according to the measured value of the output current I1_act of the fuel cell 2 as illustrated in FIG. 2C. More specifically, the voltage control gain corresponds to the sensitivity of the change in the current adjustment amount ΔI with respect to the change of the voltage deviation (i.e., the amount of change of the current adjustment amount ΔI per unit amount of change of the voltage deviation). For example, the voltage control gain corresponds to a coefficient of a proportional term (which is a term proportional to the voltage deviation) in an arithmetic process in the feedback control process.

In this case, the voltage control gain is set by a pre-created map, arithmetic expression or the like such that the voltage control gain changes according to the output current I1_act, that is, monotonically increases as the output current I1_act increases with the same tendency as the inverse of the voltage change rate shown in FIG. 2B (i.e., the current change rate).

A map or an arithmetic expression for determining the voltage control gain and the current control gain such that a value of the voltage control gain at the reference operating point P0 is equal to a value of the current control gain at the reference operating point P0 is also set.

In the present embodiment, the voltage control mode corresponds to a lower control mode described in the present invention and voltage control gain corresponds to a lower control gain described in the present invention.

Supplementally, the voltage control gain may also be set according to the measured value of the output voltage V1_act of the fuel cell 2. In this case, the current control gain is set such that it decreases monotonically as the output voltage V1_act increases.

By performing the processing of the feedback control unit 12a as described above, the current adjustment amount ΔI is sequentially determined such that the actual input voltage V1_act of the voltage conversion unit 3 approaches (and eventually converges on) the target voltage V1_cmd determined by the management control unit 11.

Figure 3:
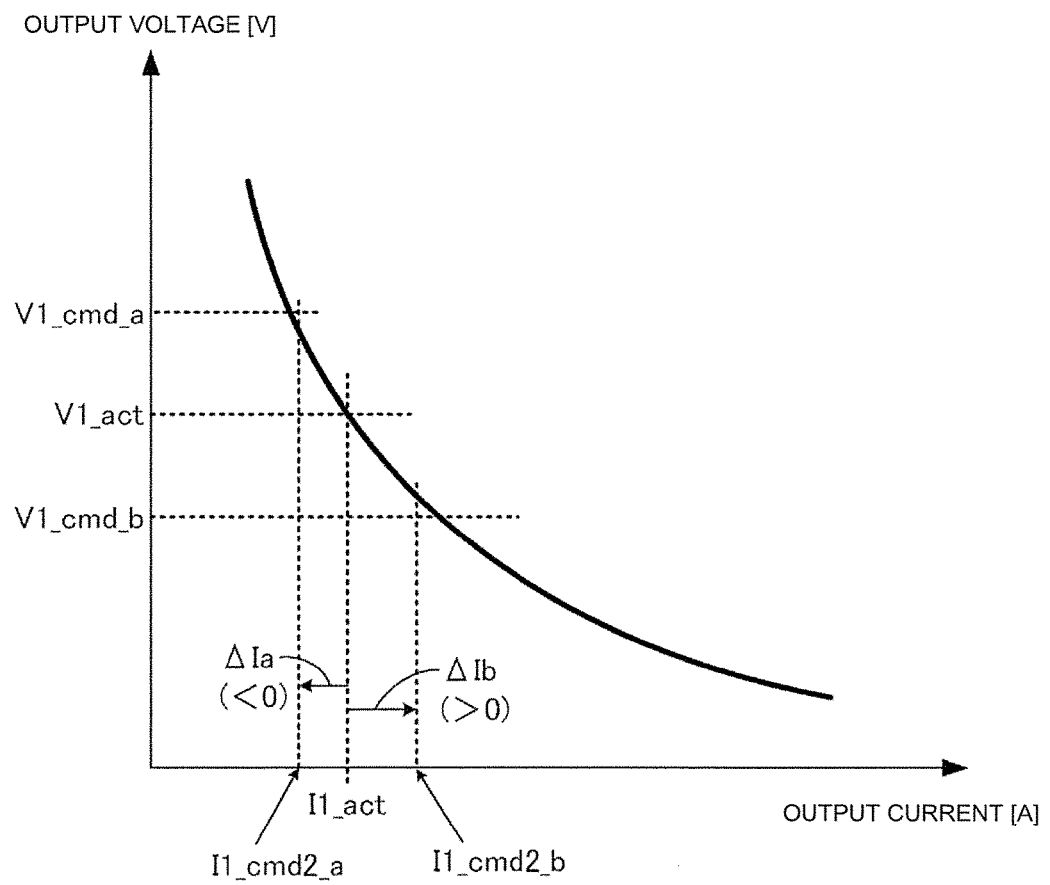
FIG. 3 is a graph illustrating a control process of a voltage control mode in the embodiment.

FIG. 3 illustrates a current adjustment amount ΔI determined in this manner. In FIG. 3, ΔIa exemplifies a current adjustment amount ΔI determined when the measured value of the input voltage V1_act of the voltage conversion unit 3 is smaller than a target voltage V1_cmd_a. In this case, the current adjustment amount ΔIa is a value (<0) in the direction of decreasing the output current (the input current of the voltage conversion unit 3) I1_act of the fuel cell 2 in order to raise the input voltage V1_act.

In addition, in FIG. 3, ΔIb exemplifies a current adjustment amount ΔI determined when the measured value of the input voltage V1_act of the voltage conversion unit 3 is greater than a target voltage V1_cmd_b. In this case, the current adjustment amount ΔIb is a value (>0) in the direction of increasing the output current (the input current of the voltage conversion unit 3) I1_act of the fuel cell 2 in order to lower the input voltage V1_act.

Next, the voltage control unit 12 performs a process of determining the target current I1_cmd2 using both the current adjustment amount ΔI determined as described above and the current measured value of the output voltage V1_act of the fuel cell 2 through a voltage control target current determination unit 12b.

In this case, data indicating the current-voltage characteristics of the fuel cell 2 shown in FIG. 2A is previously stored in the control unit 10 in the form of a map or a functional formula. The voltage control target current determination unit 12b obtains a value of the output current I1_act corresponding to the measured value of the output voltage V1_act on the basis of the above data and adds the current adjustment amount ΔI to the obtained current value to determine the target current I1_cmd2.

For example, the target currents I1_cmd2_a and I1_cmd2_b are determined as shown respectively in correspondence with the current adjustment amounts ΔIa and ΔIb illustrated in FIG. 3.

The target current I1_cmd2 may also be determined by adding the current adjustment amount ΔI to the current measured value of the output current I1_act of the fuel cell 2.

In the voltage control mode, the target current I1_cmd2 that is sequentially determined by the voltage control unit 12 as described above is applied to the current control unit 13 via the switching unit 15. Then, the current control unit 13 performs the same process as the current control mode using the target current I1_cmd2 to sequentially determine a control input such that the input current I1_act of the voltage conversion unit 3 approaches (and eventually converges on) the target current I1_cmd2. Further, the on/off duty of the switch element of the voltage conversion unit 3 is controlled by a control signal that the control signal generation unit 14 generates according to the control input.

Accordingly, the step-up rate (or the step-down rate) of the voltage conversion unit 3 is controlled such that the actual input voltage V1_act of the voltage conversion unit 3 approaches (and eventually converges on) the target voltage V1_cmd determined by the management control unit 11.

Here, how the higher threshold value IthH and the lower threshold value IthL are set in this embodiment is described below in more detail with reference to FIG. 2C.

In the present embodiment, the current control gain in the current control mode and the voltage control gain in the voltage control mode are set variably according to the measured value of the output current I1_act of the fuel cell 2 (or the measured value of the output voltage V1_act) as described above. In the present embodiment, as shown in the enlarged view of the portion C in FIG. 2C, a higher threshold value IthH and a lower threshold value IthL are set such that a value of the voltage control gain (a lower control gain) when the output current I1_act of the fuel cell 2 matches the higher threshold value IthH and a value of the current control gain (a higher control gain) when the output current I1_act of the fuel cell 2 matches the lower threshold value IthL are equal to each other.

According to the embodiment described above, the control mode is selected and switched as described above and therefore, except for the operating region of (IthL<I1_act<IthH) in the vicinity of the reference operating point P0 of the fuel cell 2, the control process of the voltage control mode is performed in a region in which the voltage change rate of the fuel cell 2 is greater than the current change rate and the control process of the current control mode is performed in a region in which the current change rate of the fuel cell 2 is greater than the voltage change rate. Therefore, voltage control by the control process of the voltage control mode and current control by the control process of the current control mode can be performed with high stability.

In addition, the control mode is switched in the vicinity of the reference operating point P0 at which the voltage change rate and the current change rate are the same and the gain in each control mode (i.e., each of the voltage control gain and the current control gain) is set as described above, and therefore a great change in the operation of the voltage conversion unit 3 before and after the switching of the control mode is prevented and the stability of the operation of the voltage conversion unit 3, and eventually the stability of the power output from the voltage conversion unit 3, can be increased.

In particular, in the present embodiment, the control input (operational amount) to be given to the control signal generation unit 14 is determined by the control process of the common feedback control unit 13a in both the voltage control mode and the current control mode, and therefore it is possible to smoothly change the control input (operational amount) to be given to the control signal generation unit 14 before and after switching of the control mode. As a result, the stability of the operation of the voltage conversion unit 3 can be increased.

In the embodiment described above, the input voltage V1_act of the voltage conversion unit 3 is controlled in the voltage control mode. However, instead of the input voltage V1_act, an output voltage of the voltage conversion unit 3 may be controlled.

In addition, the input current I1_act of the voltage conversion unit 3 is controlled in the current control mode. However, instead of the input current I1_act, an output current of the voltage conversion unit 3 may be controlled.

Further, in the above embodiment, the higher threshold value IthH and the lower threshold value IthL are used for switching of the control mode. However, the control mode may also be switched using the output current value I0 or the output voltage value V0 of the fuel cell 2 at the reference operating point P0 as a threshold value. In this case, the current control mode may be selected when the measured value of the output current I1_act is greater than the threshold value I0 or when the measured value of the output voltage V1_act is smaller than the threshold value V0, and the voltage control mode may be selected when the measured value of the output current I1_act is smaller than the threshold value I0 or when the measured value of the output voltage V1_act is greater than the threshold value V0.

Furthermore, in the present embodiment, the processing of the feedback control unit 13a is commonly used in both the voltage control mode and the current control mode. However, it is also possible to determine a control input (operational amount) to be given to the control signal generation unit 14 in the voltage control mode and the current control mode through separate feedback control processes. For example, the feedback control unit 12a of the voltage control unit 12 may be configured to directly generate a control input (operational amount) to be given to the control signal generation unit 14.

In addition, the above embodiment has been described with reference to the case in which the power source 2 is a fuel cell as an example. However, the power source 2 may be a power source other than the fuel cell. The current-voltage characteristics of the power source 2 may be characteristics of a pattern different from that shown in FIGS. 2A and 2B.

What is claimed is:

1. A voltage conversion device comprising:
a voltage conversion unit connected to a power source having current-voltage characteristics such that an output voltage of the power source changes according to an output current of the power source and such that the rate of change of the output voltage with respect to the change of the output current changes according to the output current, the voltage conversion unit being configured to be able to output power obtained by converting a voltage of power input from the power source; and a control unit configured to be able to selectively perform a control process of a current control mode in which the voltage conversion unit is operated to control an input current or an output current of the voltage conversion unit, and a control process of a voltage control mode in which the voltage conversion unit is operated to control an input voltage or an output voltage of the voltage conversion unit, wherein the control unit is configured to selectively switch between the current control mode and the voltage control mode in a preset manner on the basis of the current-voltage characteristics and to perform a control process of each of the control modes, wherein the control unit is configured to perform the control process of the voltage control mode in a region, within an operating region of the power source defined by the current-voltage characteristics, in which the voltage change rate which is the rate of change of the output voltage of the power source with respect to the change of the output current of the power source is greater than the current change rate which is the rate of change of the output current of the power source with respect to change of the output voltage of the power source, wherein the control unit is configured to perform the control process of the current control mode in a region, within the operating region, in which the current change rate is greater than the voltage change rate.

2. The voltage conversion device according to claim 1, wherein the control unit is configured to determine a control mode to be performed from among the voltage control mode and the current control mode on the basis of a magnitude relation between a measured value of the output current or the output voltage of the power source and a predetermined threshold value and to perform a control process of the determined control mode.

3. The voltage conversion device according to claim 2, wherein the predetermined threshold value is set to a value matching an output voltage value or an output current value of the power source at an operating point at which the current change rate and the voltage change rate are the same within the operating region of the power source defined by the current-voltage characteristics.

4. The voltage conversion device according to claim 2, wherein the predetermined threshold value includes a higher threshold value and a lower threshold value which are set above and below a value matching an output voltage value or an output current value of the power source at an operating point at which the current change rate and the voltage change rate are the same within the operating region of the power source defined by the current-voltage characteristics, and the control unit is configured to perform control processes of different control modes in the voltage control mode and the current control mode when a measured value of the output current or the output voltage of the power source is greater than the higher threshold value and when the measured value thereof is smaller than the lower threshold value and to perform, when the measured value has changed from a value greater than the higher threshold value or from a value smaller than the lower threshold value to a value within a range between the higher threshold value and the lower threshold value, a control process of the same control mode as a control mode immediately before the change.

5. The voltage conversion device according to claim 3, wherein the control process of the voltage control mode is a process of determining an operational amount through a feedback control process in the voltage control mode and controlling the voltage conversion unit according to the operational amount, such that the input voltage or the output voltage of the voltage conversion unit approaches a target voltage, the control process of the current control mode is a process of determining an operational amount through a feedback control process in the current control mode and controlling the voltage conversion unit according to the operational amount, such that the input current or the output current of the voltage conversion unit approaches a target current, and the control unit is configured to change a voltage control gain which is a gain of the feedback control process in the voltage control mode and a current control gain which is a gain of the feedback control process in the current control mode according to a measured value of the output current or the output voltage of the power source, and to allow a value of the voltage control gain and a value of the current control gain to match each other in a state in which a measured value of the output current or the output voltage of the power source matches a value at the operating point.

6. The voltage conversion device according to claim 4, wherein the control process of the voltage control mode is a process of determining an operational amount through a feedback control process in the voltage control mode and controlling the voltage conversion unit according to the operational amount, such that the input voltage or the output voltage of the voltage conversion unit approaches a target voltage, the control process of the current control mode is a process of determining an operational amount through a feedback control process in the current control mode and controlling the voltage conversion unit according to the operational amount, such that the input current or the output current of the voltage conversion unit approaches a target current, the control unit is configured to change a voltage control gain which is a gain of the feedback control process in the voltage control mode and a current control gain which is a gain of the feedback control process in the current control mode according to a measured value of the output current or the output voltage of the power source and to allow a value of the voltage control gain and a value of the current control gain to match each other in a state in which a measured value of the output current or the output voltage of the power source matches a value at the operating point, among the voltage control mode and the current control mode, when the measured value of the output current or the output voltage of the power source is greater than the higher threshold value, the mode of the control process to be performed is defined as a higher control mode, and when the measured value is smaller than the lower threshold value, the mode of the control process to be performed is defined as a lower control mode, and among the voltage control gain and the current control gain, when a gain corresponding to the higher control mode is defined as a higher control gain and a gain corresponding to the lower control mode is defined as a lower control gain, the higher threshold value and the lower threshold value are set such that a value of the lower control gain when the measured value of the output current or the output voltage of the power source matches the higher threshold value matches a value of the higher control gain when the measured value of the output current or the output voltage of the power source matches the lower threshold value.

7. A voltage conversion device comprising:
a voltage conversion unit connected to a power source having current-voltage characteristics such that an output voltage of the power source changes according to an output current of the power source and such that the rate of change of the output voltage with respect to the change of the output current changes according to the output current, the voltage conversion unit being configured to be able to output power obtained by converting a voltage of power input from the power source;
a control unit configured to be able to selectively perform a control process of a current control mode in which the voltage conversion unit is operated to control an input current or an output current of the voltage conversion unit, and a control process of a voltage control mode in which the voltage conversion unit is operated to control an input voltage or an output voltage of the voltage conversion unit,
wherein the control unit is configured to perform the control process of the voltage control mode in a region, within an operating region of the power source defined by the current-voltage characteristics, in which a voltage change rate which is the rate of change of the output voltage of the power source with respect to the change of the output current of the power source is greater than a current change rate which is the rate of change of the output current of the power source with respect to the change of the output voltage of the power source and to perform the control process of the current control mode in a region, within the operating region, in which the current change rate is greater than the voltage change rate.

8. A voltage conversion device comprising:
a voltage conversion unit connected to a power source having current-voltage characteristics such that an output voltage of the power source decreases as an output current of the power source increases and such that a rate of change of the output voltage with respect to a change of the output current decreases as the output current increases, the voltage conversion unit being configured to be able to output power obtained by converting a voltage of power input from the power source; and
a control unit configured to be able to selectively perform a control process of a current control mode in which the voltage conversion unit is operated to control an input current or an output current of the voltage conversion unit, and a control process of a voltage control mode in which the voltage conversion unit is operated to control an input voltage or an output voltage of the voltage conversion unit,
wherein the control unit is configured to use a threshold value which is set to a value matching an output current value of the power source at an operating point at which a voltage change rate which is the rate of change of the output voltage of the power source with respect to a change of the output current of the power source and a current change rate which is a rate of change of the output current of the power source with respect to a change of the output voltage of the power source are the same within an operating region of the power source defined by the current-voltage characteristics, and the control unit is configured to perform a control process of the voltage control mode when a measured value of the output current of the power source is smaller than the threshold value and to perform a control process of the current control mode when the measured value is greater than the threshold value.

9. A voltage conversion device comprising:
a voltage conversion unit connected to a power source having current-voltage characteristics such that an output voltage of the power source decreases as an output current of the power source increases and such that a rate of change of the output voltage with respect to a change of the output current decreases as the output current increases, the voltage conversion unit being configured to be able to output power obtained by converting a voltage of power input from the power source; and
a control unit configured to be able to selectively perform a control process of a current control mode in which the voltage conversion unit is operated to control an input current or an output current of the voltage conversion unit, and a control process of a voltage control mode in which the voltage conversion unit is operated to control an input voltage or an output voltage of the voltage conversion unit,
wherein the control unit is configured to use a threshold value which is set to a value matching an output voltage value of the power source at an operating point at which a voltage change rate which is the rate of change of the output voltage of the power source with respect to a change of the output current of the power source thereof and a current change rate which is a rate of change of the output current of the power source with respect to a change of the output voltage of the power source thereof are the same within an operating region of the power source defined by the current-voltage characteristics, and the control unit is configured to perform a control process of the voltage control mode when a measured value of the output voltage of the power source is greater than the threshold value and to perform a control process of the current control mode when the measured value is smaller than the threshold value.

10. A voltage conversion device comprising:
a voltage conversion unit connected to a power source having current-voltage characteristics such that an output voltage of the power source decreases as an output current of the power source increases and such that a rate of change of the output voltage with respect to a change of the output current decreases as the output current increases, the voltage conversion unit being configured to be able to output power obtained by converting a voltage of power input from the power source; and
a control unit configured to be able to selectively perform a control process of a current control mode in which the voltage conversion unit is operated to control an input current or an output current of the voltage conversion unit, and a control process of a voltage control mode in which the voltage conversion unit is operated to control an input voltage or an output voltage of the voltage conversion unit,
wherein the control unit is configured to use a higher threshold value and a lower threshold value which are set above and below a value matching an output current value of the power source at an operating point at which a voltage change rate which is the rate of change of the output voltage of the power source with respect to a change of the output current of the power source and a current change rate which is a rate of change of the output current of the power source with respect to a change of the output voltage of the power source are the same within an operating region of the power source defined by the current-voltage characteristics, and the control unit is configured to perform a control process of the voltage control mode when a measured value of the output current of the power source is smaller than the lower threshold value and to perform a control process of the current control mode when the measured value is greater than the higher threshold value, and to perform, when the measured value has changed from a value greater than the higher threshold value or from a value smaller than the lower threshold value to a value within a range between the higher threshold value and the lower threshold value, a control process of the same control mode as a control mode immediately before the change.

11. A voltage conversion device comprising:
a voltage conversion unit connected to a power source having current-voltage characteristics such that an output voltage of the power source decreases as an output current of the power source increases and such that a rate of change of the output voltage with respect to a change of the output current decreases as the output current increases, the voltage conversion unit being configured to be able to output power obtained by converting a voltage of power input from the power source; and
a control unit configured to be able to selectively perform a control process of a current control mode in which the voltage conversion unit is operated to control an input current or an output current of the voltage conversion unit, and a control process of a voltage control mode in which the voltage conversion unit is operated to control an input voltage or an output voltage of the voltage conversion unit,
wherein the control unit is configured to use a higher threshold value and a lower threshold value which are set above and below a value matching an output voltage value of the power source at an operating point at which a voltage change rate which is the rate of change of the output voltage of the power source with respect to a change of the output current of the power source and a current change rate which is a rate of change of the output current of the power source with respect to a change of the output voltage of the power source are the same within an operating region of the power source defined by the current-voltage characteristics, and the control unit is configured to perform a control process of the current control mode when a measured value of the output voltage of the power source is smaller than the lower threshold value and to perform a control process of the voltage control mode when the measured value is greater than the higher threshold value, and to perform, when the measured value has changed from a value greater than the higher threshold value or from a value smaller than the lower threshold value to a value within a range between the higher threshold value and the lower threshold value, a control process of the same control mode as a control mode immediately before the change.

12. The voltage conversion device according to claim 1, wherein the power source is a fuel cell.

13. An apparatus comprising the voltage conversion device according to claim 1.

14. The voltage conversion device according to claim 4, wherein the control process of the voltage control mode is a process of determining an operational amount through a feedback control process in the voltage control mode and controlling the voltage conversion unit according to the operational amount, such that the input voltage or the output voltage of the voltage conversion unit approaches a target voltage,
the control process of the current control mode is a process of determining an operational amount through a feedback control process in the current control mode and controlling the voltage conversion unit according to the operational amount, such that the input current or the output current of the voltage conversion unit approaches a target current, and
the control unit is configured to change a voltage control gain which is a gain of the feedback control process in the voltage control mode and a current control gain which is a gain of the feedback control process in the current control mode according to a measured value of the output current or the output voltage of the power source, and to allow a value of the voltage control gain and a value of the current control gain to match each other in a state in which a measured value of the output current or the output voltage of the power source matches a value at the operating point.

* * * * *